(12) United States Patent
Li et al.

(10) Patent No.: US 8,976,649 B2
(45) Date of Patent: *Mar. 10, 2015

(54) METHOD FOR PROVIDING BEARER SPECIFIC INFORMATION FOR WIRELESS NETWORKS

(71) Applicant: Apple Inc., Cupertino, CA (US)

(72) Inventors: Xiao-Dong Li, Nepean (CA); Sanket Nesargi, Richardson, TX (US); Dan Caputo, Ottawa (CA)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/282,412

(22) Filed: May 20, 2014

(65) Prior Publication Data

US 2014/0254358 A1    Sep. 11, 2014

Related U.S. Application Data

(63) Continuation of application No. 12/980,499, filed on Dec. 29, 2010, now Pat. No. 8,750,105, which is a continuation of application No. 11/093,292, filed on Mar. 30, 2005, now Pat. No. 7,899,060.

(60) Provisional application No. 60/558,526, filed on Apr. 1, 2004.

(51) Int. Cl.
*H04W 4/10* (2009.01)
*H04W 76/02* (2009.01)
(Continued)

(52) U.S. Cl.
CPC .............. *H04W 76/02* (2013.01); *H04L 45/306* (2013.01); *H04L 47/10* (2013.01); *H04L 47/14* (2013.01); *H04L 47/2408* (2013.01); *H04L 47/2433* (2013.01); *H04L 47/2441* (2013.01);
(Continued)

(58) Field of Classification Search
USPC ................... 370/230–238, 331–338, 395.42; 709/227, 236; 455/517–518, 442
See application file for complete search history.

(56) References Cited

U.S. PATENT DOCUMENTS

2002/0021681 A1* 2/2002 Madour ........................ 370/331
2003/0198204 A1* 10/2003 Taneja et al. ................. 370/332
(Continued)

OTHER PUBLICATIONS

Collan, proposal for short data burst indicator from the PDSN, 2003.*

*Primary Examiner* — Vincelas Louis
(74) *Attorney, Agent, or Firm* — Meyertons, Hood, Kivlin, Kowert & Goetzel, P.C.

(57) ABSTRACT

A Packet Control Function (PCF) may not have enough knowledge about packet data arriving on a bearer path via a Packet Data Serving Node (PDSN) to appropriately decide how best to handle the packet data. Thus, the PDSN may provide bearer-specific information by encapsulating the packet data within the payload of a Generic Routing Encapsulation (GRE) frame, and for a requested feature, setting a protocol-type field in the header of the GRE frame indicating that the packet includes an attribute field, and adding an attribute field to the payload of the GRE packet to provide attribute data corresponding to the requested feature. The PCF may send an A-11 request to the PDSN indicating which features the PDSN is requested to enable. For example, for short data indication, the PCF may request the PDSN add to the GRE frame an attribute field containing attribute data indicating when a Short Data Burst is suitable.

17 Claims, 3 Drawing Sheets

(51) Int. Cl.
*H04L 12/725* (2013.01)
*H04L 12/801* (2013.01)
*H04L 12/851* (2013.01)
*H04W 28/02* (2009.01)
*H04W 76/00* (2009.01)
*H04W 80/10* (2009.01)

(52) U.S. Cl.
CPC ........... *H04W 4/10* (2013.01); *H04W 28/0289* (2013.01); *H04W 76/005* (2013.01); *H04W 80/10* (2013.01)

USPC ...... 370/229; 370/338; 370/349; 370/395.42; 370/466

(56) References Cited

U.S. PATENT DOCUMENTS

| | | |
|---|---|---|
| 2005/0147072 A1* | 7/2005 | Mahendran et al. .......... 370/338 |
| 2005/0169171 A1* | 8/2005 | Cheng et al. ................... 370/229 |
| 2005/0185623 A1* | 8/2005 | Ray et al. ....................... 370/338 |
| 2005/0226154 A1* | 10/2005 | Julka et al. .................... 370/235 |

* cited by examiner

METHOD FOR PROVIDING BEARER SPECIFIC INFORMATION FOR WIRELESS NETWORKS

CROSS REFERENCE TO RELATED APPLICATIONS

This application claims the benefit of U.S. Provisional Application No. 60/558,526, filed Apr. 1, 2004, which is incorporated herein by reference.

FIELD OF THE INVENTION

The present invention relates generally to wireless access networks which communicate with packet data networks. More particularly, the present invention relates to CDMA2000 Networks.

BACKGROUND OF THE INVENTION

In contemporary telecommunications systems including mobile stations and cellular Base Stations (BS), calls to a mobile user are typically initiated by paging the mobile station. The mobile station (MS) is then enabled from a dormant state to an active state and a traffic channel is set up. Note that in this specification the term mobile station (MS) refers to a wireless communication device, which will typically be a mobile device (e.g., cellular telephone), but also includes fixed wireless devices which are not mobile.

A number of methods and devices exist in the prior art that attempt to reduce latency in waking up dormant communication devices and setting up a call. One such prior art reference is U.S. Pat. No. 6,725,053 issued to Rosen et al. on Apr. 20, 2004 and herein incorporated by reference. The Rosen et al. patent discloses a method and apparatus for reducing dormant-wakeup latency in a group communication network and seeks to reduce the actual total dormant-wakeup time and the Push-to-Talk (PTT or P2T) latency perceived by a talker through caching the network-initiated wakeup triggers destined for target listeners, and delivering a wakeup trigger to a target mobile station as soon as the target mobile station has re-established its traffic channel.

PTT is an emerging voice-based value added service application for many leading mobile communications service providers including CDMA2000 networks. A PTT call or session involves two or multiple parties and combines aspects of cellular mobile communications, presence detection, and walkie-talkie style communications. PTT provides end-users with the ability to quickly find one another and engage in brief, burst-oriented style communication. Advances in market adoption and technology evolution of voice over wireless Internet Protocol (IP) will enable improvements in PTT. Rather then being a replacement of long, interactive communication, PTT is best suited for demands for quick communication among end-users. Due to the fact that PTT is provided in half-duplex mode (i.e., transmission occurs in both directions, but not at the same time such that each party must wait to speak), the inability to interrupt lends itself to quick exchanges of information. A PTT system in CDMA2000 typically involves PTT mobiles, the CDMA2000 access network, and the PTT server.

During a PTT session, before a party can speak that party needs to push the PTT button on the handset to request the floor. The PTT server will arbitrate call requests among the group members and grant the floor on a first come, first serve basis or user priority. Upon receiving the floor grant (which is indicated as a beep on the handset), the PTT member can start talking while holding down the PTT button. The remaining group members will be in the listening mode as only one member can speak at any given time. Once the talker finishes their speech, they will release the floor by letting go the PTT button. Others may then push the PTT button on their handsets to request for the floor and start talking.

A PTT session or call has to be set up before the group members can engage in conversation. Within a CDMA2000 network, PTT call setup includes call origination and call termination. PTT call origination typically involves the following steps: (1) a PTT mobile signals (using IS2000 signaling messages) to the CDMA2000 access network to setup traffic channels and network connections so that PTT application traffic (signaling and voice) can be carried between the mobiles and the PTT server; (2) PTT mobiles signal (typically using Session Initiation Protocol (SIP) or some proprietary application level signaling protocol) to the PTT server to invite others to join the PTT call; and (3) upon receiving confirmation from the terminating mobiles (called parties), the PTT server will issue a floor grant to the originating mobile (the calling party). The calling party can then start talking.

A PTT call termination involves the following steps: (1) the PTT server sends invite messages to the access network for delivery to the called parties; (2) the access network locates the called PTT mobiles and exchange IS2000 signaling to setup traffic channels and then deliver the invite messages to the called PTT mobiles; and (3) the PTT mobiles respond to the PTT server to either accept or reject the invite.

There are two major performance metrics to PTT call setup: (1) "Push-to-Beep" which is the time from when the caller pushes the PTT button to when the Caller is granted the floor; and (2) Push-to-Receive which is the time from when the caller pushes the PTT button to when the voice packets arrive at the called party's mobile terminal. The above call setup process is not optimal and the push-to-beep time usually takes 4-7 seconds. The main problem is that it is strictly a sequential process where a traffic channel has to be setup to send PTT application signaling (i.e., SIP messages). Ideally, enabling some degree of parallelism by allowing transmission of PTT application signaling (i.e., SIP) while setting up the traffic channel between the mobile and the access network would be advantageous.

Using the short data burst (SDB) feature of CDMA2000 can offer some degree of parallelism. The SDB feature allows transmission of small amounts of data between the mobile and network using CDMA common channels (e.g., access channel and paging channel), without having to setup a traffic channel. For PTT call setup, the originating mobile can first send a SIP invite message to the PTT server using a SDB, then start traffic channel setup. This allows the PTT server to initiate call setup with the called parties (terminating mobiles) while the originating mobile is going through the traffic channel setup process. This helps reduce the end-to-end PTT call setup time.

In addition to PTT applications, other SIP-based applications including, but not limited to voice over internet protocol (VOIP) applications also suffer from delays in call setup within the wireless realm.

A solution for reducing these delays is taught in Commonly assigned co-pending application Ser. No. 10/879,007, which is hereby incorporated by reference.

Another difficulty to overcome resides in the fact that existing systems do not provide indications about the nature of packet data to the wireless access network. Accordingly, it is difficult to use SDB to a terminating mobile station, when the Wireless Access network receives packet data without an indication that the data is suitable for a SDB transmission.

For example, one problem that exists today is that the Packet Control Function (PCF), which typically is associated with the Base Station Controller (BSC), has limited knowledge about the nature of the packet data arriving from the Internet, on a bearer path connected via the Packet Data Serving Node (PDSN), and cannot make an intelligent decision on its own as to how best to handle the packet data. As far as the PCF is concerned, received packets simply appear as byte streams on the bearer path to be forwarded via the BSC to the Mobile Station (MS). Thus, the system can not easily determine that SDBs can be used beneficially for the underlying applications.

This problem is not limited to decisions regarding when SDBs can be best utilized, but generally limits the wireless access network from making the best use of all resources available to it.

It is, therefore, desirable to provide a solution that allows the Wireless Access Network and the PDSN to better utilize the resources available to it, including making intelligent decisions as how to best handle packet data received from a packet data network (for example, the Internet).

SUMMARY OF THE INVENTION

Advantageously, the invention provides a solution that allows the Wireless Access Network and the PDSN to better utilize the resources available to it, including making intelligent decisions as how to best handle packet data received from a packet data network. According to an aspect of the invention, the PCF is enabled with the ability to ascertain information about the packet data received from a packet data network in order to determine how to best treat the data. This can be implemented by having the PDSN classify incoming packets and adding bearer specific information as an attribute in the payload which can be utilized by the PCF.

This ability to designate different characteristics of the packet data or the wireless access network provides more detailed packet priority information to the PCF, which can also be used for implementing Flow Control, and Quality of Service (QoS) policies.

Furthermore, by using the information about the underlying applications and/or the packet data provided by the PDSN, such as the priority and Quality of Service, the wireless access network can better decide how to utilize the wireless network resources in order to satisfy the requirements. For example, for high priority signaling data such as SIP messages used for PTT call setup, the PCF can choose to deliver the packet data in SDB format over a common channel (Paging Channel) as opposed to a traffic channel. The latter normally takes considerable longer time and more resources. On the other hand, for a sustained stream of voice packets, the PCF needs to setup a traffic channel to satisfy the QoS requirements for minimum data rate and delay.

In a first aspect, the present invention provides a method of prioritizing packet data received from a packet data network for transmission by a wireless network, wherein nodes of said wireless network communicate via Generic Routing Encapsulation (GRE) protocol, said method comprising receiving packet data from a packet data network; classifying the priority of said packet data; encapsulating said packet data within the payload of a GRE frame; and for high priority packet data i) setting a protocol type field in the header of said GRE frame indicating said packet includes an attribute field; and ii) adding an attribute field to the payload of said GRE frame which provides an indication of said high priority data In a further embodiment, there is provided a method of indicating bearer-specific information in packet data exchanged between a packet data network and a wireless access network, wherein nodes of said wireless network communicate via Generic Routing Encapsulation (GRE) protocol, said method comprising evaluating the bearer information pertinent to the packet data; and i) encapsulating said packet data within the payload of a GRE frame; and ii) setting a field in the header of said GRE frame indicating the presence of bearer-specific information. iii) adding said bearer-specific information to the payload of said GRE frame.

In further aspect, the present invention provides a method for negotiating capability between the packet data network and the wireless access network, said method comprising sending a request in signaling messages from the wireless access network requesting features at time of call or link establishment; and receiving a reply in signaling messages indicating whether requested features are enabled.

Other aspects and features of the present invention will become apparent to those ordinarily skilled in the art upon review of the following description of specific embodiments of the invention in conjunction with the accompanying figures. For ease of reference, the embodiments of the invention will be described with reference to their applicability to CDMA2000 Networks.

BRIEF DESCRIPTION OF THE DRAWINGS

Embodiments of the present invention will now be described, by way of example only, with reference to the attached Figures, wherein.

DETAILED DESCRIPTION

Generally, the present invention provides a method and system for allowing packet handling nodes in the wireless access network to evaluate and indicate specific information about the packet data or the wireless network, e.g., the priority of data packets for improved handling. For purposes of clarity, the detailed description will discuss the present invention in terms of a packet data application requiring priority treatment although other packet based applications for which bearer-specific information (e.g., priority handling), including, but not limited to, QoS, Flow Control, etc. may benefit from the present invention.

Figure 1:
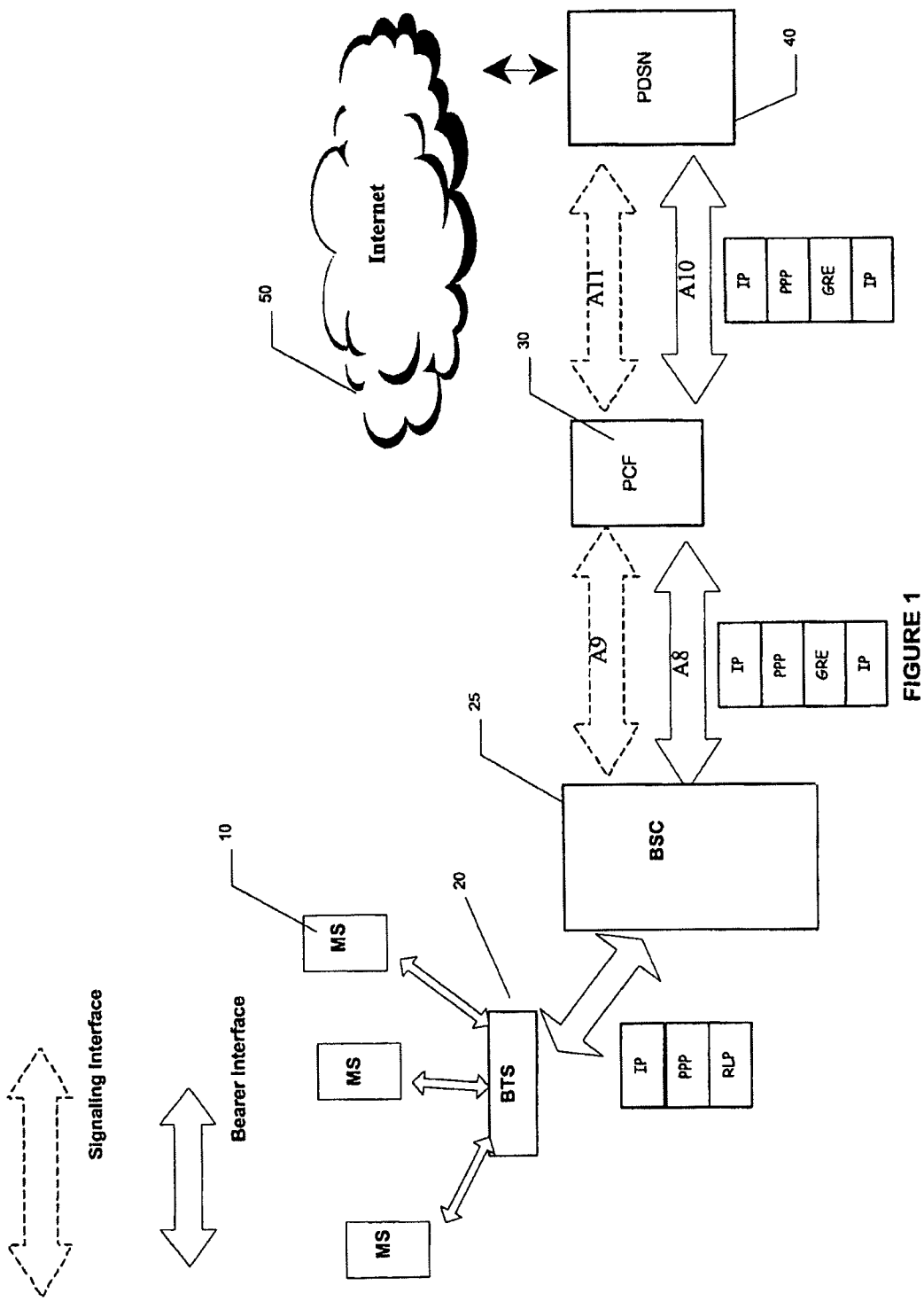
FIG. 1 is a schematic drawing showing an exemplary CDMA 2000 Network for which a preferred embodiment of the invention is configured.

FIG. 1 is a schematic drawing showing an exemplary CDMA 2000 Network for which a preferred embodiment of the invention is configured. A plurality of Mobile Stations, for example MS 8, MS 9, and MS 10 communicate via a wireless interface with a Base Station (BS) 20. BS 20 communicates with, and is controlled by, a Base Station Controller (BSC) 25. Typically, the BSC 25 communicates with, and is controlled by, a Mobile Switching Center (MSC) (not shown) for circuit switched applications, for example, a traditional voice call. For packet data services, a packet control function node (PCF) 30 communicates with the BSC 25 using a signaling channel A9 and bearer channels A8. Typically, a separate bearer channel is established for each active session for each MS. The BS 20 and the BSC/PCF are often referred to collectively as the Radio Access Network (RAN) or alternatively as the Wireless Access Network.

PCF 30 is connected to a packet data serving node (PDSN) 40. PCF 30 communicates with the PDSN 40 using a signaling channel A11 and bearer channels A10. Typically a separate bearer channel is established for each active session for each MS. The PDSN 40 also acts as an interface with a packet data network, for example, the Internet 50, which provides packet data transport of packet data services for example from a PTT Server not shown.

Note that while this figure illustrates separate nodes, some nodes may be co-located and/or integrated into a single unit. For example the BSC 25 and the PCF 30 are often integrated into a single unit.

When packet data is received by the PSDN 40 from the internet 50, the PDSN encapsulates the packets within a payload of an encapsulation protocol packet for transmission between the nodes of the Wireless Access Network.

In CDMA2000, this encapsulation protocol is the Generic Routing Encapsulation (GRE) protocol.

The A8 and A10 connections are used for the transport of user data for a packet data session. Link layer/network layer frames are carried between the BS, PCF and the PDSN encapsulated in GRE packets, which in turn are carried over IP. Each GRE packet is encapsulated in exactly one IP datagram. The BS Address, PCF Address and the PDSN Address are used in the source address and destination address fields of the IP header used with the GRE packet.

With the A10 connection and A8 connection in place, link layer/network layer packets pass over these connections in both directions between the BS and the PDSN using GRE framing. In the direction towards the BS, the PDSN encapsulates the link/network layer frames in GRE frames and sends them on the IP connection between the PDSN and PCF. The PCF decapsulates the link/network layer frames in GRE frames before forwarding them on the IP connection between the PCF and the BS. The BS accepts these GRE frames, strips the GRE headers, and processes the link/layer frames as normal incoming frames by passing them to the upper layer. The other direction behaves analogously: The BS encapsulates the link layer/network layer frames in GRE frames and sends them on the IP connection between the BS and the PCF, the PCF decapsulates the link/network layer frames received from the IP connection and re-encapsulates the link/network layer frames in GRE frames before forwarding them on the IP connection between the PCF and the PDSN. The PDSN accepts the GRE frames, strips the GRE headers, and processes the link/layer frames as normal incoming frames by passing them to the upper layer.

We will explain an embodiment of the invention relating to its implementation of the Push-To-Talk (PTT) application for CDMA2000 networks. One of the most important performance metrics for PTT is call setup time. Session Initiation Protocol (SIP) messaging is typically used by PTT applications to establish a PTT call. This type of application level signaling messages have very unique requirements compared to the other data packets. Each message is usually short and contained in one IP packet, and needs to be delivered as fast as possible in order to minimize the call setup time. Knowing this specific requirement, the Radio Access Network (RAN) should choose the optimal delivery mechanism. For instance, the RAN can use Short Data Burst (SDB) to deliver these types of data packets instead of setting up a dedicated traffic channel which will incur more overhead and longer delay than using SDB. In addition, using SDB to send SIP messages during PTT call setup can realize some degree of parallelism by allowing dormant-to-active transition and end-to-end SIP signaling to occur concurrently, and therefore can potentially shorten the setup time. However, prior to the present invention, the PCF had limited knowledge about the packet data arriving from the PDSN, and therefore was not equipped to make an intelligent decision on its own to ensure that SDB would be used beneficially for the underlying applications.

We have solved this problem by adding an attribute field to the GRE packet in order to indicate bearer-specific information, in this case, the transmission priority of the packet data. Thus, when the PCF 30 receives the GRE packet, it can evaluate the attribute field in order to execute an appropriate treatment. For example, for PTT call setup signaling, the attribute field can provide a short data indication to the PCF 30 that SDB would be an appropriate treatment. Note that transmission priority can be useful for other applications, including Flow Control, QoS, and multiple priorities for SDB. Accordingly, having the PDSN 40 tag the GRE packet with an attribute field suitability provides a simple and cost effective means for the RAN to better support applications.

According to an aspect of the invention there is provided a method of prioritizing packet data received from a packet data network for transmission by a wireless network, wherein nodes of said wireless network communicate via Generic Routing Encapsulation (GRE) protocol, said method comprising receiving packet data from a packet data network; classifying the priority of said packet data; encapsulating said packet data within the payload of a GRE frame; and for high priority packet data i) setting a protocol type field in the header of said GRE frame indicating said packet includes an attribute field; and ii) adding an attribute field to the payload of said GRE frame which provides an indication of said high priority data.

Figure 2:
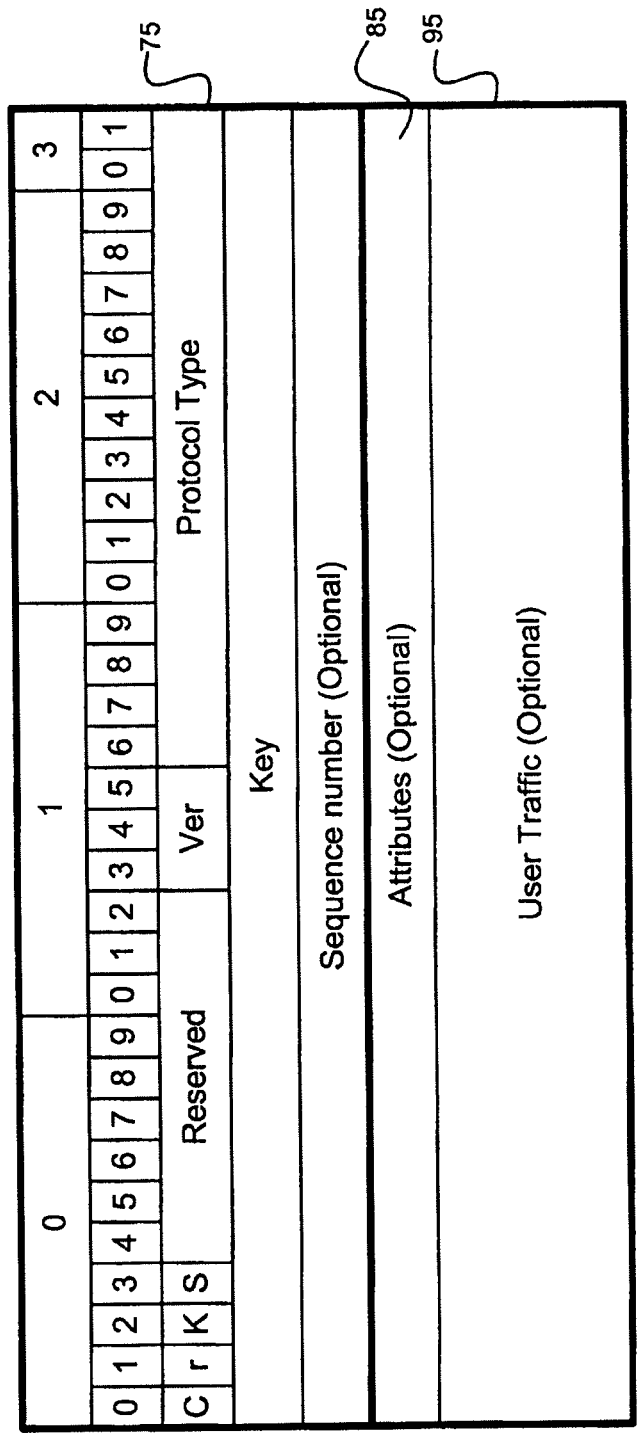
FIG. 2 shows the structure of the GRE frame according to an embodiment of the invention consistent with the 3GPP2 CDMA2000 standard.

FIG. 2 shows the structure of the GRE frame according to an embodiment of the invention consistent with the 3GPP2 CDMA2000 standard.

Note that the Attributes Field 85 and the User Traffic Fields constitute the payload 95 of the GRE frame, with the remainder of the fields forming the GRE Header 75. The GRE header is defined by the IETF: *Internet Engineering Task Force, RFC 2784—Generic Routing Encapsulation 32 (GRE)*, 2000, and its use in the context of CDMA2000 prior to the invention herein is described in *Interoperability Specification (IOS) for cdma2000 Access Network Interfaces—Part 2 Transport* located at: http://www.3gpp2.org/Public_html/specs/A.S0012-A_v2.0.1_121903.pdf, the descriptions of which are hereby incorporated by reference.

In the bearer traffic direction from the PCF to the BS, the key field in the GRE header contains a unique BS identifier that indicates which A8 connection a particular payload packet belongs to.

In the bearer traffic direction from the BS to the PCF, the key field in the GRE header contains a unique PCF identifier that indicates which A8 connection a particular payload packet belongs to.

The reserved bits are reserved by the IETF and should all be 0.

The protocol type field is used to identify the type of payload included in the user traffic field. For CDMA2000 networks it typically indicates that the payload is an Unstructured Byte Stream. According to a preferred embodiment of the invention, this field is tagged to indicate whether the GRE payload 95 also includes an attribute field 85.

No other field in the header 75 is as well suited for this purpose, as each field has an important role to play, and the length and fields of the header are well defined and standardized. The one exception is the reserved field, which is not currently used today. However, there are various problems with using the reserved field to indicate the presence of a short data indication:

The GRE header and its format are defined by IETF. Although the reserved field is not currently used today, it is reserved to allow enhancements which must be standardized. Hence, if IETF subsequently defines the reserved field in a different manner, the enhancements incorporated into the reserved field of the header will no longer be useable.

Redefining reserved fields can lead to backward compatibility problems. Older implementations expect to see the reserved bit set to 0, and upon receiving packets with this bit incorrectly set, may reject the same. The SDB feature may even be deactivated. For example, assume a PCF has been upgraded to support the new SDB indication ability, while the PDSN is still at using an older software version. The PDSN will not set the SDB indication bit within the reserved field according to the new rule, but rather will use the default setting '0'. The PCF will interpret the '0' setting, according to the new rule, as a packet being marked as unsuitable for SDB while in fact, it's simply a default setting by the older version of PDSN regardless of SDB suitability. This prevents the PCF from properly processing packets from PDSN.

The reserved field is limited in length, and cannot accommodate other features that require more bits than those available within the reserved field. Therefore using reserved field bits to tag SDB suitability is a bandage solution, which is not flexible and does not provide a generic framework to introduce new features that may be useful on the bearer.

We will now describe the Payload section 95 of the GRE frame, which includes the user data field, and an attribute field 85, if appropriate, to provide bearer-specific information. For example, the attribute field can provide an indication of transmission priority (which is useful for QoS, and multiple priorities for SDB).

Table 1 shows the structure of the GRE attribute field in general according to an embodiment of the invention consistent with the 3GPP2 CDMA2000 standard.

| 0 | 1 | 2 | 3 | 4 | 5 | 6 | 7 | Octet |
|---|---|---|---|---|---|---|---|---|
| E |   |   |   | Type |   |   |   | 1 |
|   |   |   |   | Length |   |   |   | 2 |
|   |   |   |   | Value |   |   |   | 3 |
|   |   |   |   |   |   |   |   | n |

Each attribute includes four or more octets and contains information specific to the attribute. The Attribute format is as follows. The fields are transmitted from left to right.

E: The E bit is set to 1 for the last attribute in the attribute list. It is set to zero for all other attributes.

Type: The Type field identifies the type of attribute. If the receiving entity does not recognize the value of this field, it should discard the attribute, but process the remainder of the GRE frame.

Length: The Length field indicates the length in octets of the Value field.

Value: The Value field is two or more octets in length and contains information specific to the attribute. The format and length of the Value field are determined by the Type and Length fields. The Value field may contain one or more reserved bits. The sending entity shall set the reserved bits to '0' and the receiving entity shall ignore the value of the reserved bits. If the receiving entity does not recognize the value of any non-reserved portion of this field, it should discard the attribute, but process the remainder of the GRE frame.

User Traffic The User Traffic may follow the last attribute in the attribute list, indicated by the E bit set to 1.

Table 2 shows the structure of the specific GRE attribute field having a short data indication according to an embodiment of the invention consistent with the 3GPP2 CDMA2000 standard.

| 0 | 1 | 2 | 3 | 4 | 5 | 6 | 7 | Octet |
|---|---|---|---|---|---|---|---|---|
| E = [0, 1] |   |   | Type = '000 0001' |   |   |   |   | 1 |
|   |   |   | Length = 02H |   |   |   |   | 2 |
| SDI = '1' |   |   | Reserved |   |   |   |   | 3 |
|   |   |   | Reserved |   |   |   |   | 4 |

Note that multiple priorities can be supported. For example, an SDB indication can have different values in the attribute field as follows:

SDB Indicator
  If the packet is tagged by the PDSN as being suitable for SDB transmission, it is identified by an attribute defined as follows:
  Type: 000 0011—Short Data Indication with multiple priorities
  Length: 2
  Value:
    0000 0001—packet suitable for lower priority SDB transmission
    0000 0010—packet suitable for medium priority SDB transmission
    0000 0011—packet suitable for high priority SDB transmission
  The second Octet is reserved.

This ability to designate multiple priorities provides more detailed packet priority information to the PCF, which can also be used for implementing Quality of Service (QoS) policies.

As discussed above, the PDSN receives and then classifies incoming packets in order to determine how to encapsulate the packet (and what attribute, if any should be added). This classification can be based on various information, including evaluating the source and destination IP addresses, source and destination ports and DiffServ field to identify if the incoming IP packet belongs to a high-priority session. Note for some applications, as well as classifying the packet based on the above information; the size of IP packet is evaluated to determine whether the packet is suitable for SDB transmission, and if so, as an option, the appropriate priority for the packet can be identified.

As can be seen from above, indicating the suitability for short data bursts is just one application of the present invention. In a general sense, the invention provides A method of indicating bearer-specific information in packet data exchanged between a packet data network and a wireless access network, wherein nodes of said wireless network communicate via Generic Routing Encapsulation (GRE) protocol, said method comprising evaluating the bearer information pertinent to the packet data; and i) encapsulating said packet data within the payload of a GRE frame; and ii) setting a field in the header of said GRE frame indicating the presence of bearer-specific information. iii) adding said bearer-specific information to the payload of said GRE frame.

By Bearer-specific information, we refer to parameters that pertain to features supported on the bearer. Along with the Short Data Indication described herein, these features include QoS support and Flow control. For example, flow-control should be activated when the bearer-path gets congested and cannot accommodate more packets. Utilizing the flow control feature, the PCF can request the PDSN to stop transmitting packets until the congestion condition alleviates. Bearer-specific information, can also include other bearer parameters, for example an identification of which IP flow the packet belongs to. A GRE tunnel transports packets from multiple IP flows between the PDSN and the access network. However, if the access network needs to identify which IP flow a packet belongs to, this capability can be supported by including an appropriate extension (in the attribute field) in the GRE packet containing the relevant information.

Now that we have described the features that can be supported by the PDSN, we shall discuss how these features can be requested by the RAN. This is important to address backward compatibility between nodes (in cases where only one of the PCF or PDSN is updated with this new capability).

Accordingly, an aspect of the invention provides a method for negotiating capability between the packet data network and the wireless access network, said method comprising 1) sending a request in signaling messages from the wireless access network requesting features at time of call or link establishment; and 2) receiving a reply in signaling messages indicating whether requested features are enabled.

Returning to our example of a CDMA2000 system, according to an embodiment of the invention Step 1 includes having the PCF send an A-11 request to the PDSN indicating the features that the PCF is requesting the PDSN enable. For example, for a short data indication, the PCF would request the PDSN enable adding the attribute field to the GRE frame when an SDB is suitable. This may be implemented by adding a new Application Type and Sub-type defined in Normal Vendor/Organization Specific Extension (NVSE) for PCF Enabled Features and Short Data Indication respectively. If the PDSN is suitably equipped to enable the requested feature(s), it will acknowledge this in an A-11 reply.

Figure 3:
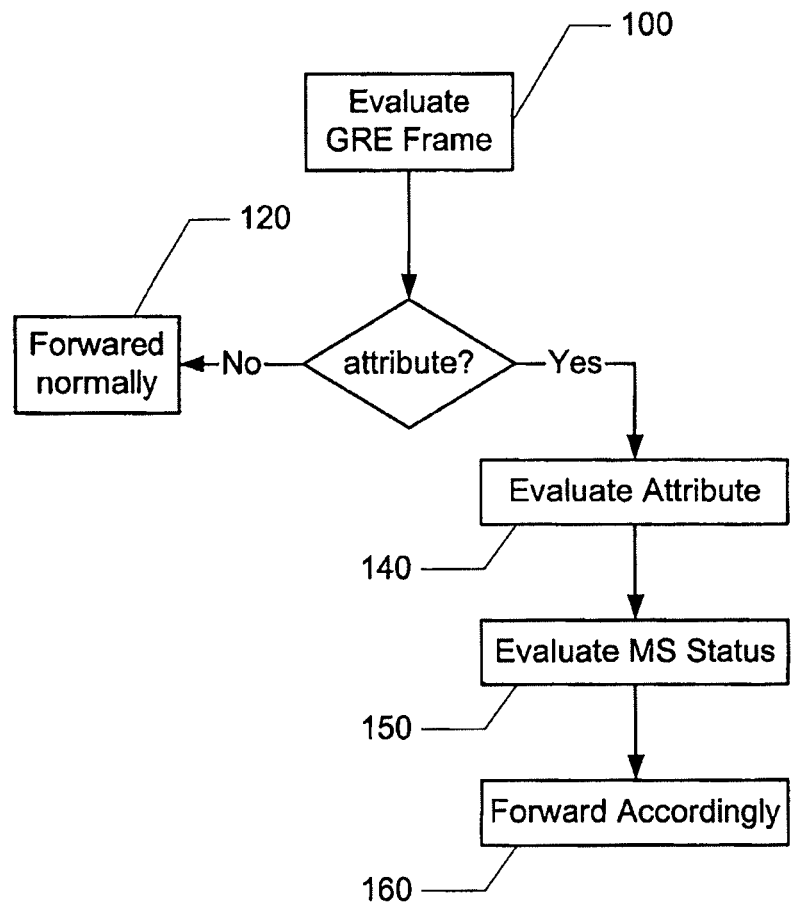
FIG. 3 is a flowchart illustrating the process implemented by the PCF upon receiving a GRE frame from the PDSN.

FIG. 3 is a flowchart illustrating the process implemented by the PCF upon receiving a GRE frame from the PDSN. The PCF evaluates the incoming GRE frame (100) by analyzing the header in the conventional manner. If the protocol field does not indicate the presence of an attribute field, than the PCF forwards (or otherwise processes the GRE frame) according to its conventional routines 120. However, if the protocol type field indicates an attribute field is present, than the PCF evaluates the attribute field 140. For this example, we assume the data is suitable for SDB and the attribute field includes a SDB indication. Than, the PCF will determine the most appropriate mechanism to forward the data to the mobile 160, based on the priority information included in the attribute field, the status of the mobile 150 and the capacity of the network. The PCF uses these factors to determine the appropriate data rate, delay (if any) and which physical channel to use 160.

If the mobile is on a call (or otherwise has a bearer channel associated with it), than the PCF can instruct the access network to forward the data using the existing channel. If the mobile is not on a call (e.g., idle or dormant), than the PCF can instruct the access network to forward the data using a SDB, based on the priority of the data, its size, and the capacity of the radio access network.

For example, for high priority short data: the PCF can instruct the BS to implement a broadcast by sending the SDB directly to the mobile without paging. As this can have a high impact on Paging CH capacity, this may depend on the capacity of the Paging CH. For another example, for Low priority data (or if the PCH has low capacity): the PCF can instruct the BS to page the mobile to find its location, and then deliver the SDB to the mobile, as this has a lower impact on the PCH capacity.

Note that although we have only discussed the PCF process for SDB, similar steps can be implemented for other applications (which would of course have different attributes), for example allowing QoS differentiation among multiple data flows. The important concept to note is that providing the PCF with attribute data allows it to Make better use of network (e.g., BS) resources.

The PCF can also enable features such as Flow Control when the radio interface between the RAN and the MS gets congested and cannot accommodate any significant traffic. In this scenario, the PCF evaluates the condition of the available radio resources and subsequently informs the PDSN of the need for flow control. The Flow control condition is indicated by including an attribute header in a GRE packet from the PCF to the PDSN. In this scenario, the PDSN will execute a treatment of suspending the further sending of traffic packets to the PCF until an explicit indication indicating alleviation of the congestion condition is received at the PDSN.

More details of the operation of the above described embodiments may be ascertained by reference to the Interoperability Specification (IOS) for cdma2000—Access Network Interfaces, published by the 3$^{rd}$ Generation Partnership Project 2, for example:

Interoperability Specification (IOS) for cdma2000 Access Network Interfaces—Part 2 Transport located at: http://www.3gpp2.org/Public_html/specs/A.S0012-C_v1.0_050224.pdf;

Interoperability Specification (IOS) for cdma2000 Access Network Interfaces—Part 3 Features located at: http://www.3gpp2.org/Public_html/specs/A.S0013-C_v1.0_050224.pdf; and Interoperability Specification (IOS) for cdma2000 Access Network Interfaces—Part 7 (A10 and A11 Interfaces) located at: http://www.3gpp2.org/Public_html/specs/A.S0017-C_v1.0_050224.pdf The descriptions of which are all hereby incorporated by reference.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method for negotiating capability between a packet data network and a wireless network, wherein nodes of the wireless network communicate via Generic Routing Encapsulation (GRE) protocol, the method comprising:

sending a request in signaling messages from the wireless network requesting features at time of call or link establishment, comprising requesting that GRE frames received from the packet data network include in payloads of the GRE frames one or more attribute fields comprising attribute data corresponding to the requested features, wherein the requested features include an indication of support for receiving high-priority data indications and the packet data network comprises a packet data serving node (PDSN); and receiving a reply in signaling messages indicating whether the requested features are enabled.

2. The method of claim 1, wherein the negotiating takes place between a packet control function and the packet data serving node.

3. The method of claim 1, wherein the attribute data comprises an indication of support for receiving short data indication.

4. The method of claim 1, wherein attribute data comprises Flow Control information.

5. A wireless communication system comprising:
a packet data network; and
a wireless network comprising nodes communicating via Generic Routing Encapsulation (GRE) protocol, wherein the wireless network is configured to send a request in signaling messages from the wireless network requesting features at time of call or link establishment, wherein requesting the features comprises requesting that GRE frames received from the packet data network include in payloads of the GRE frames one or more attribute fields comprising attribute data corresponding to the requested features, wherein the requested features include an indication of support for receiving high-priority data indications and the packet data network comprises a packet data serving node (PDSN);
wherein the packet data network is configured to receive the signaling messages, and
responsive to the signaling messages, transmit to the wireless network return signaling messages indicating whether the requested features are enabled.

6. The wireless communication system of claim 5, wherein the attribute data comprises an indication of support for receiving short data indication.

7. The wireless communication system of claim 5, wherein the attribute data comprises Flow Control information.

8. The wireless communication system of claim 5, wherein the wireless network comprises a packet control function (PCF);
wherein the signaling messages from the wireless network comprise A-11 requests;
wherein the return signaling messages from the packet data network comprise A-11 replies; and wherein the A-11 requests and the A-11 replies are part of a negotiation that takes place between the PCF and the PDSN.

9. The wireless communication system of claim 8, wherein the A-11 requests comprise an indication of which features the PCF is requesting the PDSN to enable.

10. The wireless communication system of claim 8, wherein the packet data network is configured to add a protocol type field in a header of the GRE frame indicating a presence of the attribute field within the GRE payload.

11. A communications system comprising:
a communication node comprising:
processing circuitry; and
a non-volatile memory device configured to store programming instructions executable by the processing circuitry to cause the communication node to:
send a request in signaling messages in a wireless network requesting features at time of call or link establishment, wherein requesting the features comprises requesting that Generic Routing Encapsulation (GRE) frames received by the communication node from a packet data serving node (PDSN) include in payloads of the GRE frames one or more attribute fields comprising attribute data corresponding to the requested features and wherein the requested features include an indication of support for receiving high-priority data indications; and
receive a reply in signaling messages indicating whether the requested features are enabled;
wherein nodes of the wireless network communicate via GRE protocol.

12. The communications system of claim 11, wherein the attribute data comprises an indication of support for receiving short data indication.

13. The communications system of claim 11, wherein the attribute data comprises Flow Control information.

14. The communications system of claim 11, further comprising:
a base station; and
a base station controller configured to establish communication between the base station and the communication node, wherein the base station controller is configured to communicate with the communication node using a signaling channel A9 and bearer channels A8.

15. The communications system of claim 14, further comprising one or more mobile stations configured to communicate with the base station via respective wireless interfaces.

16. The communications system of claim 11, further comprising a packet data network, wherein the PDSN is configured to operate as an interface between the packet data network and the communication node.

17. The communications system of claim 11, wherein at least one of the GRE frames comprises a GRE header and a GRE payload, wherein the GRE header comprises a protocol type field indicating the presence of the attribute field within the GRE payload.

* * * * *